United States Patent
Cheng (10) Patent No.: US 10,750,837 B2
(45) Date of Patent: Aug. 25, 2020

(54) NAIL POLISH CURING DEVICE WITH A LIGHT ABSORBING CHAMBER

(71) Applicant: Kuo Chang Cheng, Taoyuan (TW)

(72) Inventor: Kuo Chang Cheng, Taoyuan (TW)

(73) Assignee: Kuo Chang Cheng, Taoyuan (TW)

( * ) Notice: Subject to any disclaimer, the term of this patent is extended or adjusted under 35 U.S.C. 154(b) by 308 days.

(21) Appl. No.: 16/022,646

(22) Filed: Jun. 28, 2018

(65) Prior Publication Data

US 2019/0320775 A1 Oct. 24, 2019

(30) Foreign Application Priority Data

Apr. 19, 2018 (TW) .............................. 107205126 U (51) Int. Cl.
*G21K 5/00* (2006.01)
*A45D 29/00* (2006.01)
*B01J 19/12* (2006.01)

(52) U.S. Cl.
CPC ............ *A45D 29/00* (2013.01); *B01J 19/123* (2013.01); *A45D 2200/205* (2013.01); *B01J 2219/0877* (2013.01); *B01J 2219/1203* (2013.01)

(58) Field of Classification Search
CPC . A45D 29/00; A45D 2200/205; B01J 19/123; B01J 2219/0877; B01J 2219/1203
USPC .................... 250/492.1, 493.1, 494.1, 504 R
See application file for complete search history.

(56) References Cited

U.S. PATENT DOCUMENTS

| 8,242,475 B1 * | 8/2012 | Cheng ................... A45D 29/00 118/620 |
| 10,264,866 B1 * | 4/2019 | Luu ......................... A45D 29/00 |
| 2014/0000640 A1 * | 1/2014 | Janda ....................... A61K 8/36 132/200 |
| 2015/0216284 A1 * | 8/2015 | Bitoh ..................... A45D 29/00 132/200 |
| 2017/0006993 A1 * | 1/2017 | Rivero ................... A45D 29/00 |

* cited by examiner

*Primary Examiner* — Nicole M Ippolito
(74) *Attorney, Agent, or Firm* — Idea Intellectual Limited; Margaret A. Burke; Sam T. Yip (57) ABSTRACT

A nail polish curing device with a light absorbing chamber is provided, including: a lower case, an upper case, a control module and a bottom plate. The lower case includes an enclosed wall and an opening on a side of the wall. A chamber is formed by the opening and the wall. The upper case is detachably mounted on the lower case. An upper opening and a recess that serves as a hidden handle are provided on the upper case. The control module is disposed on the upper case and is configured to activate UV light emitting diode module. Herein, a light absorbing layer is provided on the bottom plate and on each surface of the lower case in the chamber. The light absorbing layers are configured to completely absorb UV light emitted by the UV light emitting diode.

10 Claims, 6 Drawing Sheets

NAIL POLISH CURING DEVICE WITH A LIGHT ABSORBING CHAMBER

CROSS-REFERENCE TO RELATED APPLICATION

This application claims the priority of Taiwanese patent application No. 107205126, filed on Apr. 19, 2018, which is incorporated herewith by reference.

FIELD OF THE INVENTION

The present invention relates to a nail polish curing device; more particularly, relates to a nail polish curing device configured to cure the nail polish on nails of a user with UV light emitting diodes; in addition, a chamber of the nail polish curing device is provided with a light absorbing characteristic.

BACKGROUND OF THE INVENTION

In the area of artistic nail designs, it is well known to illuminate and cure UV liquid gel applied on nails with a UV light source. For example, a common and conventional nail polish curing device generally has a reversed U-shape. A user may place his/her fingers at the opening to cure the nail polish on nails. Alternatively, the user may hold the device with his hand in a reversed direction so as to radiate nails of his/her toes with the light source. Such a device is disadvantageous in that it has to be held in hand when being used to radiate toe nails. Because the user has to hold the device and keep the device in a position toward the toe nails, the user may feel tired and sore after a certain period of time.

Another kind of a conventional nail polish curing device, also considered as a most commonly seen one, is a device with a casing that accommodates a light source of UV light emitting diodes. An opening is provided at a side of the casing to allow fingers to enter. In such a way, the user may put his/her fingers into the opening to cure the nail polish on nails. However, because it is difficult for the user to visually distinguish a designated location at which the UV light emitting diodes illuminate, the user often fail to put the nails at the desired location once his/her fingers or toes are entered into the opening, thus lowering the curing efficiency of the nail polish curing device. Further, the UV light may contact the skin or eyes of the user via direct illumination or reflection, thus causing discomfort or damage.

SUMMARY OF THE INVENTION

Based on the above reasons, a primary objective of the present invention is to provide a nail polish curing device with a light absorbing chamber. The surfaces of the chamber are treated with black coating in order to completely absorb the UV light emitted by UV light emitting diodes. As a result, the UV light is prevented from contacting the skin or eyes of a user via reflection, and a degree of comfort in using the nail polish curing device is significantly enhanced.

In order to achieve the foregoing objectives, a nail polish curing device with a light absorbing chamber is provided. The nail polish curing device includes: a lower case, at least one UV light emitting diode module, an upper case, at least one rechargeable battery, a control module and a bottom plate. The lower case includes an enclosed wall and an opening on a side of the wall. A chamber is formed by the opening and the wall. The UV light emitting diode module is disposed on the lower case. When activated, the UV light emitting diode module is configured to illuminate the chamber with a UV light emitting diode. The upper case is detachably mounted on and enclosing the lower case. An upper opening that leads to the chamber is provided on a side of the upper case, and a recess that serves as a hidden handle is also provided on the upper case. The rechargeable battery is installed on the lower case for providing electricity to the nail polish curing device. The control module is disposed on the upper case and comprises at least one control button and a display. The control button is configured to activate and for setting an activation duration of the UV light emitting diode module. The display is configured to display operation information of the nail polish curing device. The bottom plate is detachably mounted to the lower case via a plurality of foot pads. At least one finger positioning structure is provided on the bottom plate, and the finger positioning structure is located inside the chamber. Herein, a light absorbing layer is provided on the bottom plate and on each surface of the lower case in the chamber. The light absorbing layers are configured to completely absorb UV light emitted by the UV light emitting diode.

According to an embodiment of the present invention, the light absorbing layers are structural layers formed by surface treatments that applies black coating, and each of the light absorbing layers is one or more of an electrodeposition (ED) layer, an anodic layer, a powder coating layer and a liquid coating layer of high/low temperature. In addition, in some embodiments, the light absorbing layers are formed by a nano heat dissipation coating, and are configured to absorb UV light having a wavelength between 350 nm-450 nm. Further, in some embodiments of the present invention, a photocatalyst layer is applied on each of the light absorbing layers.

According to an embodiment of the present invention, each of the foot pads is a silicone pad, and the silicone pads are configured to detachably engage with the bottom plate and the lower case so as to facilitate the detachably connection between the bottom plate and the lower case. In addition, a foldable foot stand is disposed on each of the two ends of a bottom surface of the lower case that are near the opening. When the bottom plate is removed from the lower case, the foot stand may unfold into a standing position, thereby supporting an open side of the nail polish curing device with an angle.

According to an embodiment of the present invention, the finger positioning structure is a plurality of protrusions arranged in an arc shape. In such a way, the user may position his/her fingers or toes more easily in the chamber.

According to an embodiment of the present invention, the nail polish curing device further includes at least one heat radiator disposed on the lower case.

According to an embodiment of the present invention, the nail polish curing device further includes a charging port disposed on a side of the upper case. The charging port is electrically connected to the rechargeable battery, so an external power source may be used to charge the rechargeable battery via the charging port.

DETAILED DESCRIPTION OF THE INVENTION

The accompanying drawings are included to provide a further understanding of the invention, and are incorporated in and constitute a part of this specification. The drawings illustrate embodiments of the invention and, together with the description, serve to explain the principles of the invention.

Figure 1A:
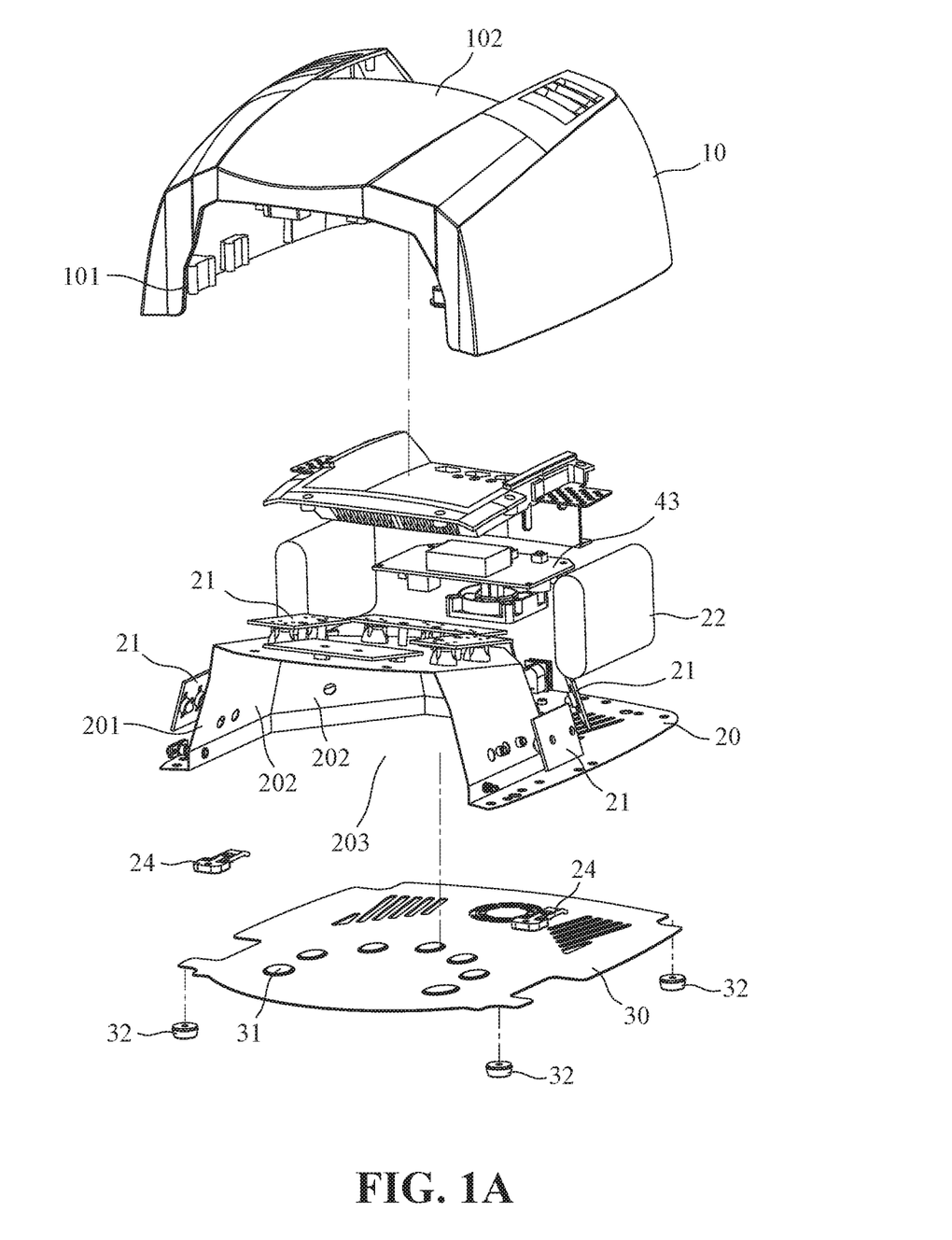
FIG. 1A is a perspective and exploded view illustrating a nail polish curing device according to a preferred embodiment of the present invention.
Figure 1B:
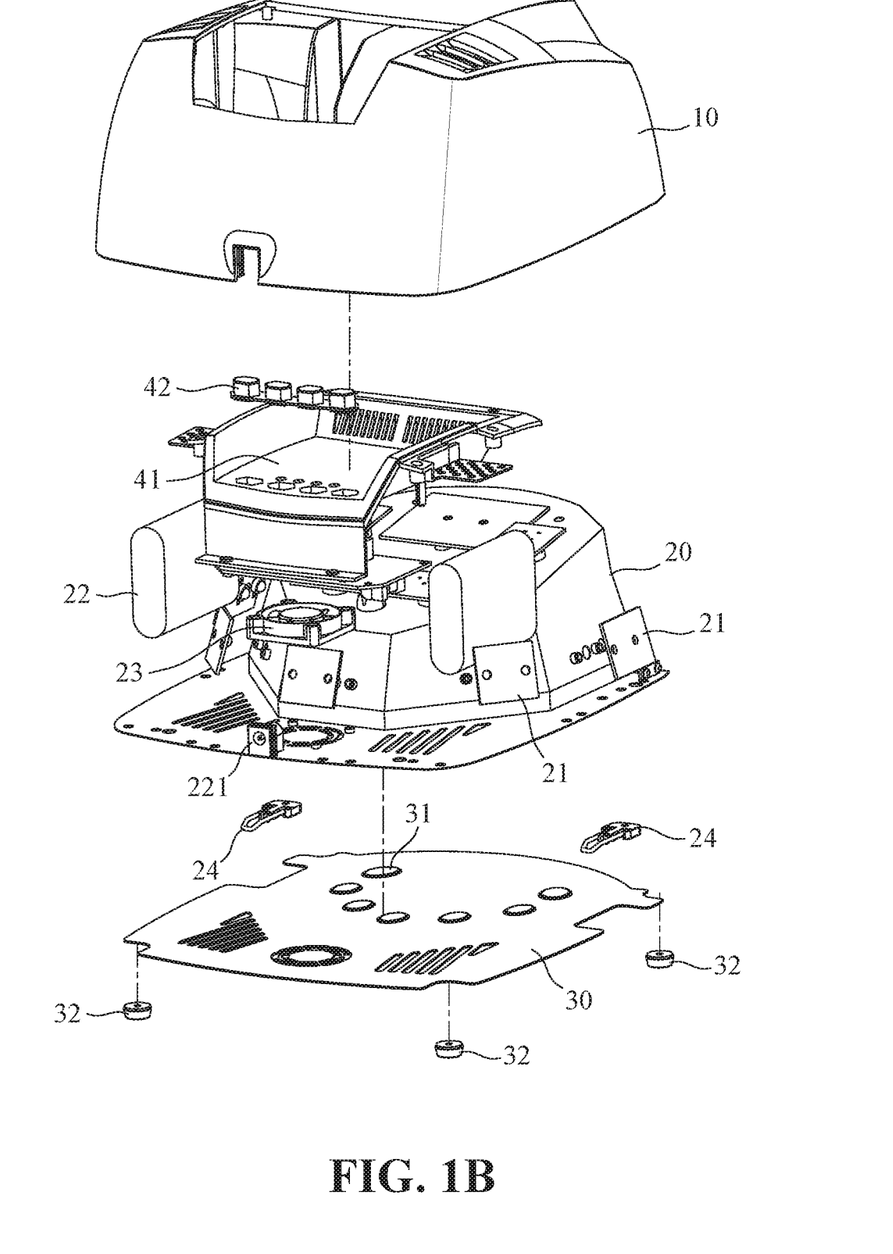
FIG. 1B is a perspective and exploded view illustrating the nail polish curing device from another angle according to the preferred embodiment of the present invention.
Figure 2:
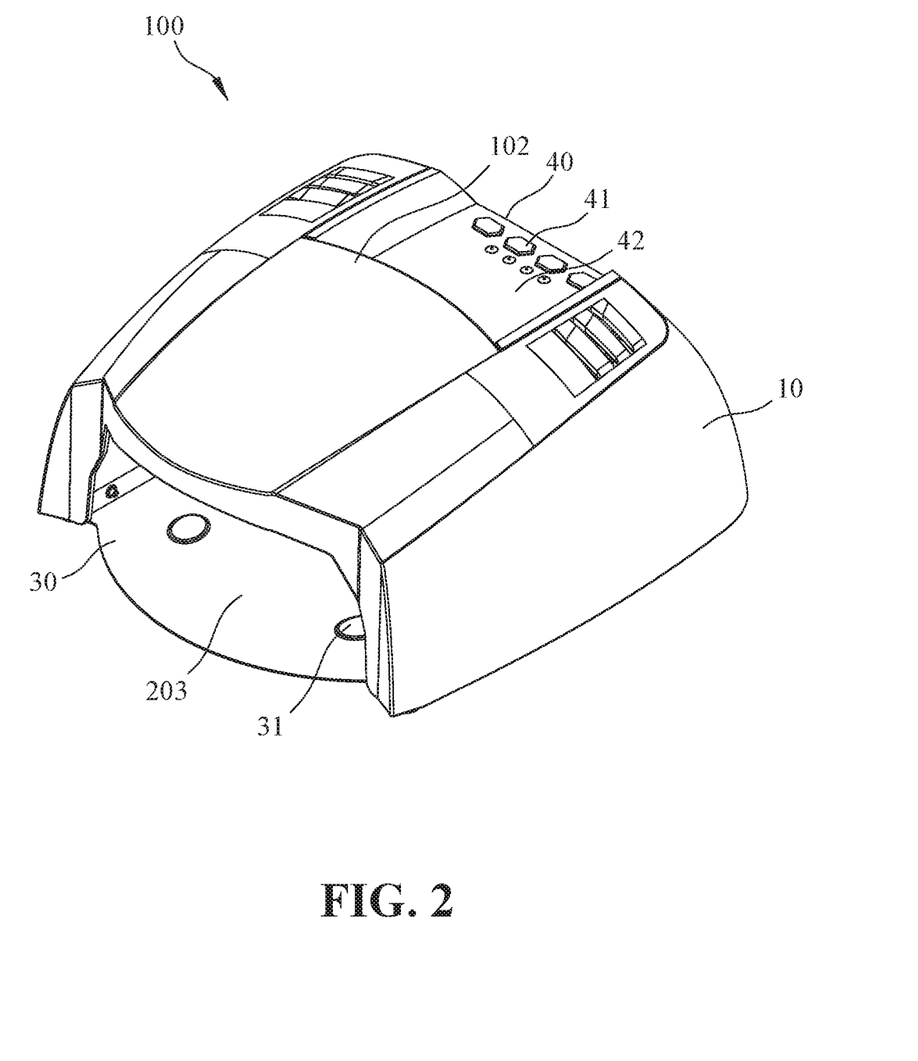
FIG. 2 is a perspective view illustrating the nail polish curing device according to the preferred embodiment of the present invention.

FIG. 1A is a perspective and exploded view illustrating a nail polish curing device according to a preferred embodiment of the present invention. FIG. 1B is a perspective and exploded view illustrating the nail polish curing device from another angle according to the preferred embodiment of the present invention. FIG. 2 is a perspective view illustrating the nail polish curing device according to the preferred embodiment of the present invention. As shown in FIGS. 1A, 1B and 2, the nail polish curing device 100 with a light absorbing chamber of the present invention includes: an upper case 10, a lower case 20 and a bottom plate 30. The upper case 10 is detachably mounted to the lower case 20, and the bottom plate 30 is detachably mounted to the lower case 20 via a plurality of foot pads 32. Hereafter, components of the nail polish curing device 100 will be explained in further details.

The upper case 10 is detachably mounted on the lower case 20 to enclose the lower case 20. An upper opening 101 is provided at a side of the upper case 10. A recess that serves as a hidden handle 102 is provided on a top side of the upper case 10, so a user may hold or pick up the nail polish curing device 100 via the hidden handle 102. In addition, a control module 40 is also provided on the top side of the upper case 40 for controlling the operation of the nail polish curing device 100. The configuration and function of the control module 40 will be explained in further details later.

As shown in FIG. 1A, the lower case 20 includes an opening 201 at a side thereof and an enclosed wall 202, and a chamber 203 is formed by the opening 201 and the wall 202. In addition to the chamber 203 that constitutes the nail polish curing device 100, the lower case 20 may be used to fix the components of the nail polish curing device 100. As shown in FIGS. 1A-1B, the nail polish curing device 100 of the present invention further includes a plurality of UV light emitting diode modules 21, at least one rechargeable battery 22 and a heat radiator 23, which are all mounted on the lower case 20.

The UV light emitting diode modules are mounted on side surfaces and a top surface of the lower case 20. When activated, UV light emitting diodes of the UV light emitting diode modules 21 are configured to illuminate the chamber 203. In the preferred embodiment of the present invention, the nail polish curing device 100 includes two rechargeable batteries 22. The rechargeable batteries 22 are mounted on the lower case 20 for providing electricity to the components of the nail polish curing device 100. As shown in FIG. 1B, a charging port 211, which is electrically connected to the rechargeable batteries 21, is provided at a back side of the nail polish curing device 100. As such, an external power source may be connected to the charging port 221 to charge the rechargeable batteries 21. Further, the heat radiator is provided on the lower case 20 of the nail polish curing device 100 so as to accelerate the dissipation of the heat generated by the UV light emitting diode modules 21. In the preferred embodiment of the present invention, the heat radiator 21 is a fan. However, the heat radiator 21 is not limited thereto and may also be any other conventional heat dissipation components such as heat sinks.

As shown in FIGS. 1A and 1B, a plurality of finger positioning structures 31 are formed on the bottom plate. The finger positioning structures 31 are located inside the chamber 203. As such, when the user enters his/her fingers or toes into the chamber 203, the user may put his/her finger or toes at the location where the UV light emitting diodes are configured to illuminate at by 'feeling' the finger positioning structures 31. As a result, not only the curing efficiency of the nail polish curing device may be enhanced, the user is also prevented from having to directly look into the light source of the UV light emitting diodes, thus reducing the damage from UV light to the eyes of the user. In the preferred embodiment of the present invention, the finger positioning structures 31 are oval protrusions arranged in an arc shape. However, the arrangement of the finger positioning structures 31 is not limited thereto.

Figure 3:
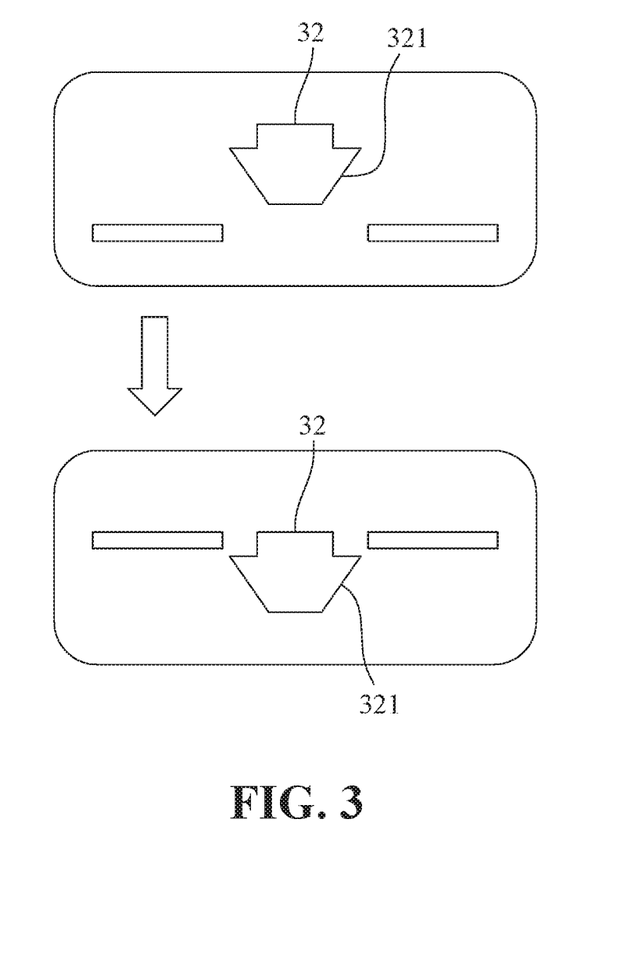
FIG. 3 is schematic view illustrating the engagement of foot pads according to the preferred embodiment of the present invention.

The bottom plate 30 is detachably attached to the lower case 20 via the plurality of foot pads 32. FIG. 3 is schematic view illustrating the engagement of foot pads according to the preferred embodiment of the present invention. As shown in FIG. 3, in the preferred embodiment of the present invention, each of the foot pads 32 is a silicone pad, and the silicone pads are configured to detachably engage with the bottom plate 30 and the lower case 20 so as to facilitate the detachably connection between the bottom plate 30 and the lower case 20. In particular, each of the silicone pads may have an engaging portion 321. Because of the elastic characteristic of the silicone pads, when engaging the bottom plate 30 with the lower case 20, a force may be applied to the silicone pads to force the engaging portion 321 through a corresponding hole on the bottom plate 30 and the lower case 20 to facilitate the detachably connection between the bottom plate 30 and the lower case 20. As a result, the user may easily remove or change the bottom plate 30. Notably, the connection between the bottom plate 30 and the lower case 20 is not limited thereto. For example, the bottom plate 30 may also be attached to the lower case 20 via detachable components such as screws and the foot pads 32.

Figure 4:
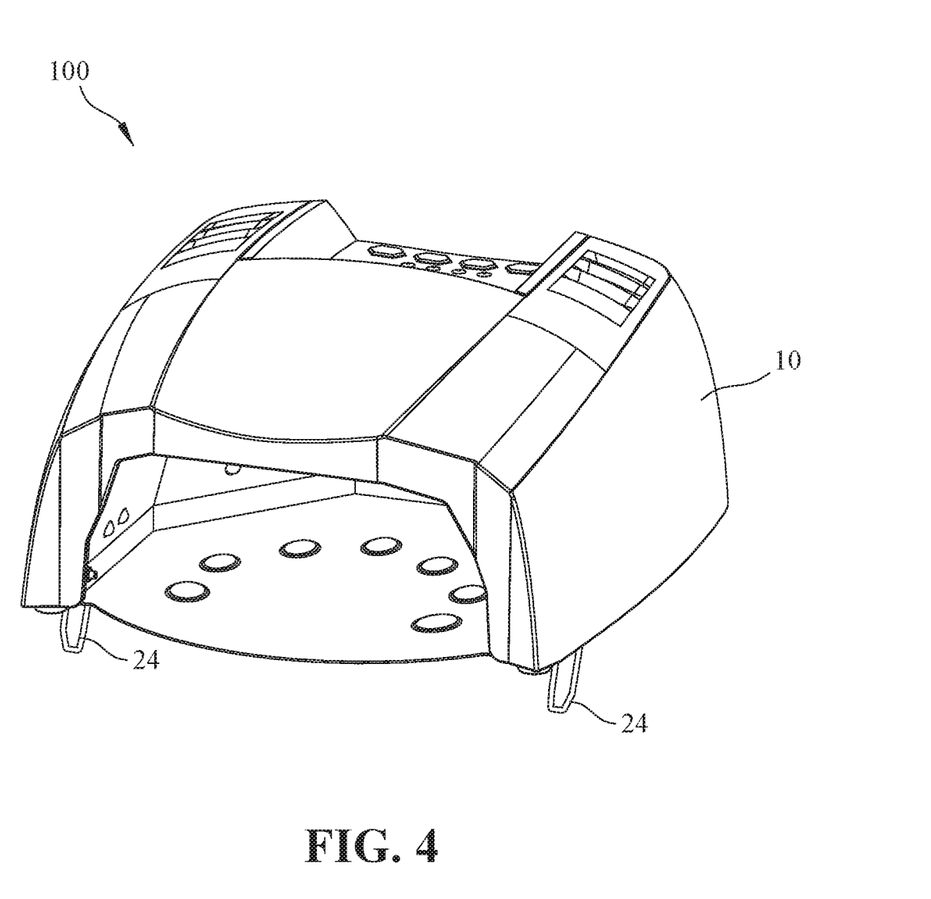
FIG. 4 is a schematic view illustrating food stands of the nail polish curing device in a standing position according to the preferred embodiment of the present invention.

On the other hand, a foldable foot stand 24 is disposed on each of the two ends of a bottom surface of the lower case 20 that are near the opening 201. During normal operation of the nail polish curing device 100, the foot stands 24 are folded into a folded position in which it aligns with and contacts the lower case 20. When foot stands 24 are needed, the bottom plate 30 should be removed from the lower case 20 first before the foot stands 24 can be unfolded into a standing position. Once the foot stands 24 are in the standing position, an open side of the nail polish curing device 100 may be supported by the foot stands 24 with an angle, as shown in FIG. 4.

Figure 5:
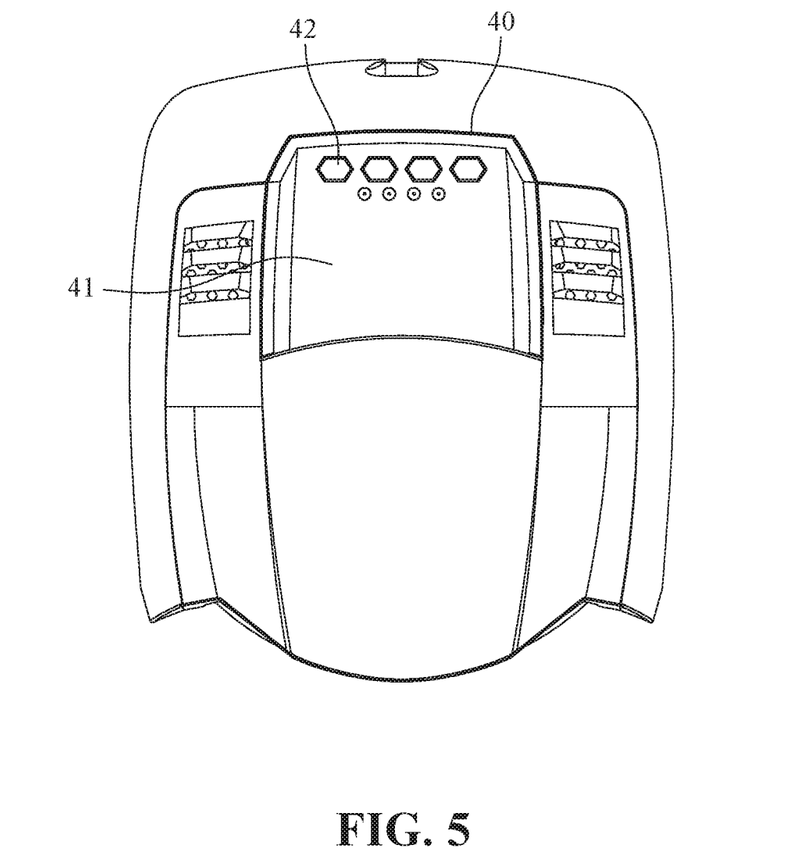
FIG. 5 is a top view illustrating the nail polish curing device according to the preferred embodiment of the present invention.

FIG. 5 is a top view illustrating the nail polish curing device according to the preferred embodiment of the present invention. Please refer to FIGS. 1A, 2 and 5, the control module 40, which is disposed on the upper case 10, further comprises a display 41 and a plurality of control buttons 42. The control module 40 is electrically connected to a control circuit 43 that is disposed on the lower case 20. The control buttons 42 are configured to activate the nail polish curing device 100. More particularly, the control buttons 42 are configured to activate the UV light emitting diode module 21 so as to illuminate the chamber 203 with UV light emitting diodes. In the preferred embodiment of the present invention, the control module 40 includes multiple control buttons 42, and each of the control buttons 42 may activate the nail polish curing device 100 with different time durations. For example, four control buttons 42 may be configured to activate the nail polish curing device 100 for ten seconds, thirty seconds, sixty seconds and ninety seconds, respectively. However, functions of the buttons are not limited thereto and may be configured according to different needs of the user. For example, control buttons may be configured to activate pre-set time durations, or, they may be configured to set and activate arbitrary activation durations. Further, the display 41 may be configured to display operation information regarding the nail polish curing device 100, for example, activation duration of the device and remaining percentage of the battery.

In the preferred embodiment of the present invention, a light absorbing layer (not shown) is formed on each surface of the chamber 203, i.e., each surface of the lower case 20 that constitutes the chamber 203 and a surface of the bottom plate 30 that is located in the chamber 203. The light absorbing layers are structural layers formed by surface treatments that apply black coating. According to the preferred embodiment of the present invention, each of the light absorbing layers is one of an electrodeposition (ED) layer, an anodic layer, a powder coating layer and a liquid coating layer of high/low temperature. In addition, the light absorbing layers are configured to absorb UV light having a wavelength between 350 nm-450 nm.

With the light absorbing layers formed by surface treatments that apply black coating, each surface inside the chamber 203 may completely absorb the UV light emitted by the UV light emitting diodes, so none of the UV light is reflected by the chamber 203. As such, the nail polish curing device 100 of the present invention may prevent the skins and eyes of the user from being irritated by the reflected UV light completely. Not only the damage to the skins and eyes may be significantly reduced, but the degree of comfort in using the nail polish curing device is also greatly enhanced. In some embodiments, the light absorbing layers may formed by a nano heat dissipation coating, so the surfaces of the chamber 203 may absorb the UV light while dissipating heat at the same time.

In some embodiments of the present invention, a photocatalyst layer (not shown), which is formed by titanium dioxide, is applied on each of the light absorbing layers. Because the photocatalyst layer has the ability to regenerate their activity while absorbing UV light, it may be used to kill bacteria, prevent mold/mildew growth and also achieve the effect of deodorization with oxidation.

In short, with the light absorbing layers on each surface of the chamber formed by surface treatments that apply black coating, the nail polish curing device 100 may completely prevent the skins and eyes of the user from being irritated by the reflected UV light, thus further enhancing the safety and degree of comfort when using the device. Furthermore, with the foot pads 32 as silicone pads, the bottom plate 30 may be easily detached from the lower case 20, thus improving the convenience of the device. Moreover, with the rechargeable batteries 22 and the hidden handle 102, the nail polish curing device 100 may be held and picked up easily. Such a design is especially convenient in scenarios such as holding the device to cure nail polish on toe nails, thus increasing the applicability of the device.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A nail polish curing device with a light absorbing chamber, comprising:
    a lower case comprising an enclosed wall and an opening on a side of the wall, wherein a chamber is formed by the opening and the wall;
    at least one UV light emitting diode module disposed on the lower case, wherein the UV light emitting diode module is configured to illuminate the chamber with a UV light emitting diode when activated;
    an upper case detachably mounted on and enclosing the lower case, wherein an upper opening that leads to the chamber is provided on a side of the upper case, and a recess that serves as a hidden handle is provided on the upper case;
    at least one rechargeable battery installed on the lower case for providing electricity to the nail polish curing device;
    a control module disposed on the upper case and comprising at least one control button and a display, wherein the control button is configured to activate and for setting an activation duration of the UV light emitting diode module, the display is configured to display operation information of the nail polish curing device; and
    a bottom plate detachably mounted to the lower case via a plurality of foot pads, wherein at least one finger positioning structure is provided on the bottom plate, and the finger positioning structure is located inside the chamber;
    wherein a light absorbing layer is provided on the bottom plate and on each surface of the lower case in the chamber, the light absorbing layers are configured to completely absorb UV light emitted by the UV light emitting diodes.

2. The nail polish curing device according to claim 1, wherein the light absorbing layers are structural layers formed by surface treatments that apply black coating, and each of the light absorbing layers is one or more of an electrodeposition (ED) layer, an anodic layer, a powder coating layer and a liquid coating layer of high/low temperature.

3. The nail polish curing device according to claim 1, wherein the light absorbing layers are configured to absorb UV light having a wavelength between 350 nm-450 nm.

4. The nail polish curing device according to claim 1, wherein the light absorbing layers are formed by a nano heat dissipation coating.

5. The nail polish curing device according to claim 1, wherein a photocatalyst layer is applied on each of the light absorbing layers.

6. The nail polish curing device according to claim 1, wherein each of the foot pads is a silicone pad, and the silicone pads are configured to detachably engage with the bottom plate and the lower case so as to facilitate the detachably connection between the bottom plate and the lower case.

7. The nail polish curing device according to claim 1, wherein a foldable foot stand is disposed on each of two ends of a bottom surface of the lower case that are near the opening.

8. The nail polish curing device according to claim 1, wherein the finger positioning structure is a plurality of protrusions arranged in an arc shape.

9. The nail polish curing device according to claim 1 further comprising at least one heat radiator disposed on the lower case.

10. The nail polish curing device according to claim 1 further comprising a charging port disposed on a side of the upper case, wherein the charging port is electrically connected to the rechargeable battery, so an external power source may be used to charge the rechargeable battery via the charging port.

* * * * *